Figure 1:
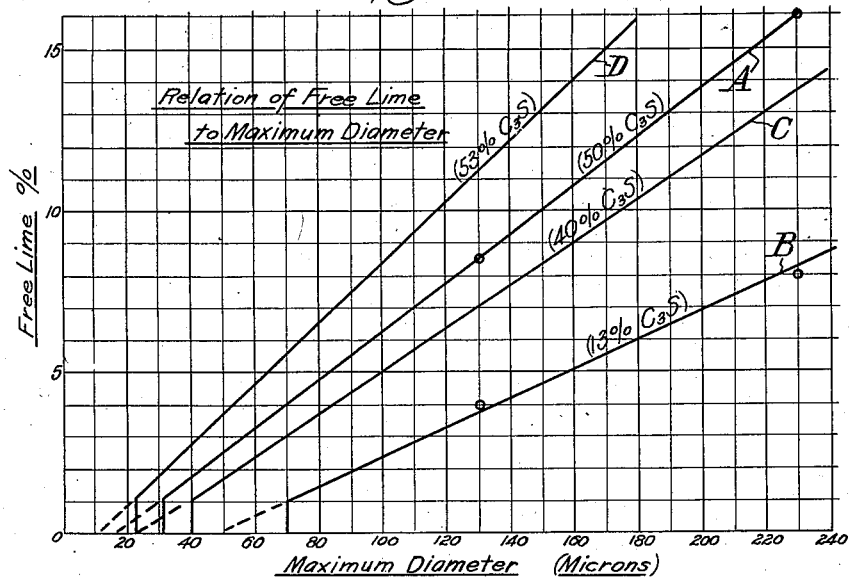

June 8, 1937.  L. T. WORK  2,083,179

PROCESS OF MAKING CEMENT

Filed Oct. 10, 1934

Inventor:
Lincoln T. Work
By Potter, Pierce & Scheffler
his Attorneys

Patented June 8, 1937

2,083,179

UNITED STATES PATENT OFFICE 2,083,179

PROCESS OF MAKING CEMENT

Lincoln T. Work, New York, N. Y.

Application October 10, 1934, Serial No. 747,774

2 Claims. (Cl. 106—25)

The present invention relates to the manufacture of cement, and is concerned more particularly with a process or method for effecting combination of the reactants, under heat, without fusion or clinkering. My invention also embraces the product of this process.

The type of cement involved in this application may be broadly defined as one in which essentially non-cementitious materials are caused to react by heat to form compounds having hydraulic properties, such reactions normally being carried out by formation of a fusion mass or clinker. Portland cement is the chief example of this type.

From the beginning of Portland cement manufacture there has been a growing recognition of the importance of fine particle size. Patents before 1900 defined the size characteristics very roughly, and, judging from commercial application, did not represent the same degree of fineness which is attained today. The more recent prior art lends a quantitative aspect to the rough concept of that earlier period. For example, it has been known that fine grinding produces an intimate mixture of particles of several different compositions, and that these particles react more completely during the process of burning and clinker formation, yielding a clinker of improved quality. It is also known that when the lime content of a Portland cement raw mixture is high, there is a tendency for some of the lime to remain unreacted, leaving faulty clinker. To meet this latter difficulty it had been proposed to burn the mixture to a clinker, re-grind it, and burn again, thus securing an intimate mixture and a homogeneous, completely reacted, clinker. In order to produce a similar type of cement other investigators had proposed to grind the raw mixture very fine, and then complete the reaction in one burning period with the formation of a completely reacted clinker. Another prior art proposal was to calcine limestone and disintegrate it by hydration to a very fine particle size, then to mix the resulting product with finely divided clay and to burn that mixture to a clinker. Thus it may be seen that the prior art indicates the importance of fine particle size in a non-homogeneous mixture, and that these products are reacted to form clinker. However, so far as I am aware, prior investigators have not recognized that all these chemical compositions produced in the clinker are capable of being produced from a raw mixture by reacting it at a point below the temperature of appreciable liquid formation.

I have found that it is possible to effect the cement-forming chemical reactions between the subdivided reactants substantially in the solid phase and without appreciable liquid formation, by a process which comprises heating an intimate mixture of the subdivided reactants at reaction temperature but below that temperature at which the dominant or main products of the reaction become liquid.

I have found, further, that to expedite the reaction at below clinkering temperature I may advantageously, and preferably do, control the degree of subdivision of the raw mixture, or of the ingredients thereof, in conformity with potential characteristics of the reaction product. That is to say, I have discovered that a relationship exists between the potential tri-calcium silicate content of the reaction product and the extent of subdivision of the raw materials consistent with cement formation without clinkering. Accordingly, it may be stated that the preferred embodiment of my invention is a process according to which for each raw mixture there is computed the potential tri-calcium silicate value thereof, the raw mixture thereupon is ground to a maximum particle size determined for that tri-calcium silicate value, and the so-prepared, intimately admixed, raw mixture is heated at a temperature sufficient to induce the desired chemical reactions but below that temperature at which the main products of reaction become liquid. Secondary products, such as sodium or potassium glasses, and intermediate products of the main reactions, may produce some liquid, but the material formation of clinker or fused reaction product is avoided. When the cement-making process is thus effected the reaction product (cement) is either a powder or a loosely coherent mass or sinter which may be reduced to normal, or greater than normal, fineness with the expenditure of materially less grinding energy than would be necessary were the product in the clinker form heretofore customary.

In working in accordance with the preferred embodiment of my invention, I utilize fine grinding and separating procedures whereby to produce a finely divided raw mixture in which the upper limit of particle size is defined: this limit is (as will be brought out more particularly hereinafter) subject to some variation, depending upon the nature of the raw materials, the characteristics desired in the final product, and the conditions under which the calcining furnace is operated.

Following the usual procedure in the manufacture of Portland or related cements, I take the product of the ball mill or one of equivalent fineness, and separate from it all over-size particles as subsequently defined. When operating by the wet process, this is effected by means of a classifying device, and the coarse material is returned to the mill for further grinding. In the event that the raw material (rock) contains coarse, siliceous, grits difficult to grind, I may separate the siliceous grit from the calcite or limestone by a flotation procedure; but, instead of mixing the over-size limestone particles with the material going to the calcining furnace or kiln, I return it to the mill for further grinding to meet the size requirement indicated, according to the process of the present invention, for the particular raw mixture undergoing calcination. When using the dry process of classification I may use an air separator which is capable of effecting a cut in the range below sieve mesh. The over-size from such separation is returned to the mill for further grinding, or may be separated before such disintegration by electrostatic separation or other process for removing hard particles difficult to grind. Whatever steps are taken to attain the ultimate particle size, a mixture of suitable chemical composition and suitable particle size is obtained in accordance with my subsequent definition of these factors.

The raw mixture so prepared is then placed in any suitable calcining device, with or without special bonding or briquetting, and is there subjected to heating at a reaction temperature below that at which the dominant products of the reaction would become liquid. The resulting product from the kiln or calcining device may be differentiated from the standard cement clinker of commerce in that it is a readily distintegrated material, or even a powder, requiring relatively little grinding to bring it into usable condition. In the event that the reaction is not complete when a comparatively coarse raw mixture is used, I may further operate the process either by separating hydraulic constituents, or by grinding the mixture and re-burning.

In determining the factors which have an important bearing on the functioning of the process of this invention, I have found that in heating to reaction temperature but below the clinkering temperature continued exposure beyond the normal time in the kiln is not of great importance compared to such factors as composition and fineness.

Measurement of the completeness of the reaction is made by a free lime test of the reaction product, which test shows the amount of calcium oxide which has not reacted. A maximum of 2% or 3% of free lime is allowable in industrial practice for essentially complete reaction. Experimental tests have been made on a series of mixtures of the following compounds:

1. Chemical analyses

|  | A | B | C | D | E | F |
|---|---|---|---|---|---|---|
| Silica $SiO_2$ | 17.3 | 19.1 | 24.9 | 24.1 | 23.4 | 22.0 |
| Alumina $Al_2O_3$ | 14.2 | 15.7 | 4.0 | 3.8 | 3.8 | 3.5 |
| Iron Oxide $Fe_2O_3$ | | | 5.3 | 5.1 | 4.0 | 4.7 |
| Lime $CaO$ | 67.9 | 64.6 | 64.9 | 66.1 | 61.7 | 69.1 |
| Magnesia $MgO$ | | | .8 | .8 | .8 | .7 |
| Loss on ignition | 36.8 | 35.9 | 34.1 | 35.7 | 30.7 | 27.7 |

All values except loss on ignition expressed as percentage on ignited basis.

2. Computed compositions

|  | A | B | C | D | E | F |
|---|---|---|---|---|---|---|
| Tricalcium silicate $3CaO, SiO_2$ | 50 | 13 | 40 | 53 | 63 | 84 |
| Dicalcium silicate $2CaO, SiO_2$ | 12 | 45 | 41 | 29 | 19 | |
| Tricalcium aluminate $3CaO, Al_2O_3$ | 38 | 42 | 2 | 1 | 1 | 1 |
| Tetracalcium alumino ferrite $4CaO, Al_2O_3, Fe_2O_3$ | | | 16 | 16 | 16 | 14 |

Portions of each of these mixtures were ground to different degrees of fineness and calcined at different temperatures. The reactions took place from 1000–1100° C. up to a clinkering temperature in the range of 1350–1450° C., and unreacted lime was further combined in the liquid above that temperature. The actual temperature of liquid formation did not differ greatly for the different finenesses, but did differ with chemical composition. If the maximum size of a particle in any one of these mixtures is plotted against the free lime value resulting at a given temperature and time of burn, a linear relation, often straight, results.

For example, in Series A, maintaining the temperature of burning at 1425° C., a maximum size of particle of 230 microns yields a free lime content of 16%, while the same mixture with a maximum size of 130 microns yields a free lime content of 8.5%; and it is only when the maximum size of particle approximates 30 microns that the free lime content is lowered to 1%. On the other hand, Series B (lower in lime content) at the same temperature of 1425° C.—which is below clinkering—yields only 8% free lime with the 230 micron size, and 4% free lime with the 130 micron size. When this sample is reduced to 70 microns, the resulting product in unclinkered form contains only 1% free lime. Similarly, Series C requires to be ground to about 40 microns; Series D to 25; and Series E and F to a still finer particle size to insure less than 1% free lime after burning—in this case at 1350° C. It is therefore possible to plot for these samples and the selected diameters a curve in which maximum diameter in microns and percent tricalcium silicate are related. It may be seen that for 15% tricalcium silicate the particles need be no finer than 70 microns for this reaction to be effected without clinkering, but that for the tricalcium silicate content to reach 50% the raw mix should be ground to a maximum particle size of about 30 microns.

Figure 2:
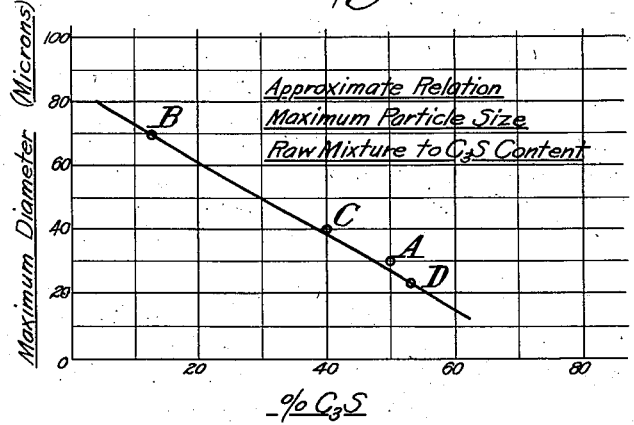

Certain of the above-recited data have been employed in preparing the graphs of Figs. 1 and 2 of the accompanying drawing. The graph in Fig. 1 shows for the first four mixtures of the preceding tables the relation existing between maximum diameter of particle in the raw mixture and content of free lime in the reaction product, the time and temperature of burning being fixed in each of the four instances. Samples A and B were burned at a temperature of 1425° C., while samples C and D were burned at a temperature of 1350° C. The graph in Fig. 2 shows the approximate relation existing between maximum particle size in the raw mixture and the potential tri-calcium silicate content of the resulting reaction product. In each case the content of tri-calcium silicate has been referred to by giving the numerical value in percent, followed by the expression "C₃S", which latter is a commonly used abbreviation for tri-calcium silicate. It will be observed, as to the graph of Fig. 2, that the curve B C A D is derived from the results plotted in the graph of Fig. 1.

It is noted that the data illustrated in Fig. 1 are illustrative. One need not so operate as to reduce the free lime content to the arbitrary figure 1% or less, it being a fact that compositions produced in accordance with the present invention containing up to 5-10% free lime are acceptable, e. g., as superior mortar cements.

In disclosing the behavior of the above specific raw mixtures, I do not wish to restrict myself to these limits of size versus composition, but desire broadly to protect any commercial conditions in which the size control and the temperature control are employed to produce cementitious reaction products without the formation of clinker. Further, I do not wish to limit the operation of this process to the production of powdery reaction products only, but include a light sinter as differentiated from clinker, in which former the grinding characteristics of the calcined product permit of saving a large portion of the grinding energy heretofore necessary in producing a finished commercial cement. The normal clinker of commerce is in general made up of dark hard lumps, usually ¼" to 1" diameter, showing a reasonably continuous solid phase when fractured. It may even be glassy. The product of my process differs from this in being a light powdery substance which crumbles but does not fracture: it is not an essentially continuous solid phase even when aggregated. The particles in the latter are discrete and may at the most be stuck together by a light sinter, point-to-point, bond as differentiated from a continuous mass of melt. To draw an analogy, clinker may be said to resemble in appearance an igneous rock, e. g., "trap rock", while my product more closely resembles sedimentary material, such as "clay".

The advantages accruing from the process of the present invention are many fold. One important feature consists in a large saving of grinding energy in pulverizing or disintegrating the finished product with usual retarding agent, e. g., gypsum. The ordinary clinker of commerce is hard and abrasive, and to reduce it to suitable fineness entails high power and maintenance costs. These may be saved to a large extent by grinding the raw mix to a suitable size for reaction without clinkering. Another advantage lies in the desirable size range of the finished material: the very fine particles are coalesced by the reaction while coarse particles are not formed. Thus, "flour", which reacts with water almost instantaneously, is eliminated without serious impedance to the available reacting surface of the finished cement. Another advantage lies in the lower operation temperatures of the kiln, with a marked decrease in fuel cost as well as kiln maintenance cost.

I claim:

1. In the process of making cement involving the operations of subdividing essentially non-cementitious materials consisting essentially of compounds of lime, alumina and silica capable, upon sufficient heating in admixture, of reacting to form the main reaction products of a Portland cement composition, preparing a raw mixture of the subdivided materials, and causing the materials therein to react by heating the same, the improvement which consists in subdividing the materials of the raw mixture to a maximum particle size within the diameter range of from about 20 to about 70 microns which maximum particle size increases with the decrease in the potential tri-calcium silicate value of the raw mixture, and in heating the so-subdivided raw mixture at reaction temperature but below that temperature at which the main reaction products liquefy.

2. In the process of making cement involving the operations of subdividing essentially non-cementitious materials consisting essentially of compounds of lime, alumina and silica capable, upon sufficient heating in admixture, of reacting to form the main reaction products of a Portland cement composition, preparing a raw mixture of the subdivided materials, and causing the materials therein to react by heating the same, the improvement which consists in controlling the subdivision of the raw mixture so that when said raw mixture contains 5% of potential $C_3S$ the maximum particle size is 80 microns, the maximum particle size decreasing by about 6 microns for each increase of 5% in the $C_3S$ value of the raw mixture, and in heating the so-subdivided raw mixture at reaction temperature but below that temperature at which the main reaction products liquefy.

LINCOLN T. WORK.